July 30, 1968
J. W. VON BRIMER
3,395,288
BATTERY GUARD SYSTEM
Filed May 19, 1964
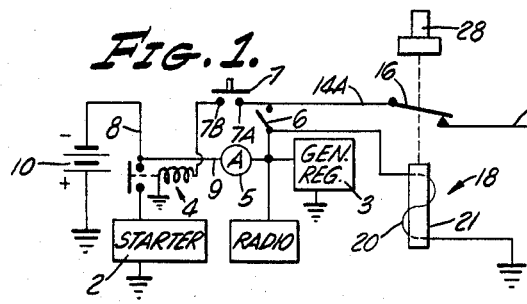
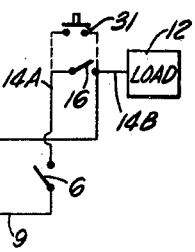
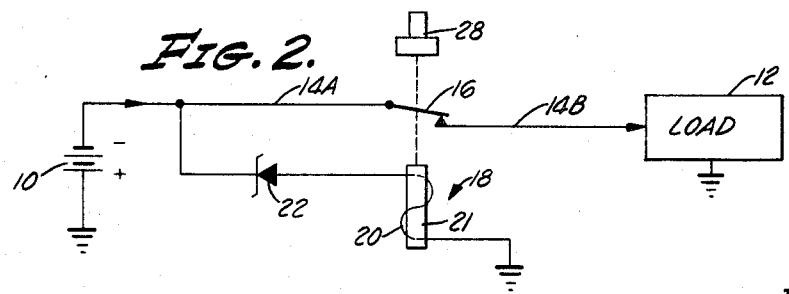
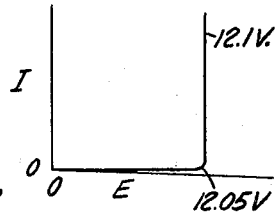
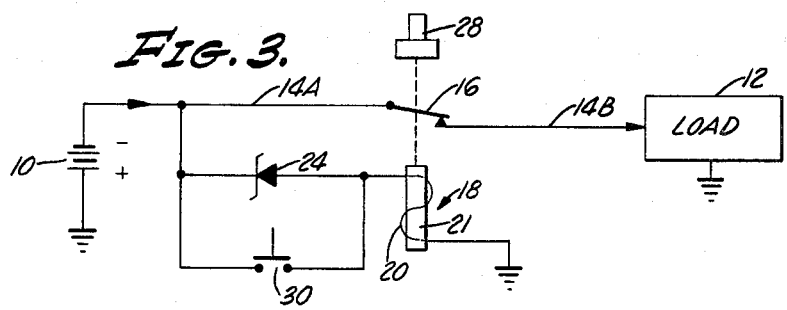
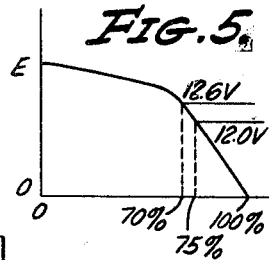
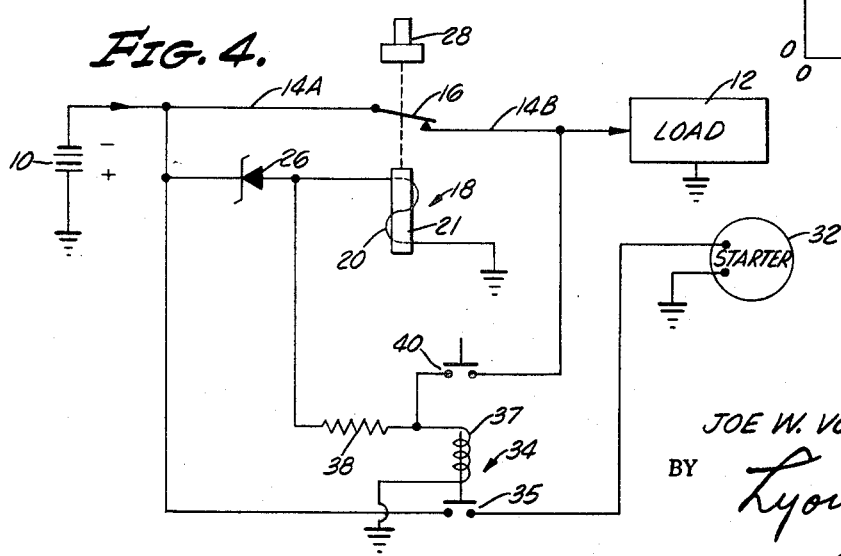
INVENTOR.
JOE W. VON BRIMER
BY Lyon & Lyon
ATTORNEYS

3,395,288
BATTERY GUARD SYSTEM
Joe W. von Brimer, Van Nuys, Calif. (% VB Research & Development, 1700 Westwood Blvd., Los Angeles, Calif. 90024)
Filed May 19, 1964, Ser. No. 368,661
3 Claims. (Cl. 307—10)

The present invention relates to means and techniques useful in systems supplied with current from a battery source and serves to protect an otherwise good battery against complete discharge through inadvertence, accident or mistake, the present invention being particularly useful in automobiles, trucks, tractors, etc. for preventing batteries from completely discharging when ignition switches, lights, radios or such loads are inadvertently left on.

Many autoists have had the sad experience of finding their battery too "weak" to start their automobile as a result of its standing in a parked or garaged condition with, for example, one or more of its lamps lit, its radio or ignition system turned on, a partial short circuit, or as a result of previous failure of its generator or regulator system to function as normally expected prior to such parking or garaging.

It is an object of the present invention to provide means and techniques whereby the battery is still "strong" enough to energize the starter sufficiently to start the engine under the conditions exemplified above.

For these purposes, a voltage sensitive relay is provided having a drop-out voltage which is related to the voltage condition of the battery, the relay having contacts which open when the battery voltage is substantially equal to the drop-out voltage to thereby disconnect the battery from the wiring leading to the current consuming devices. The term drop-out voltage of a relay is that minimum voltage necessary for the armature of the relay to be maintained in a magnetically attracted position with any incremental voltage less than such drop voltage resulting in the armature returning to an unattracted position and the associated relay switch being operated. Similarly, the term pull-in voltage as used herein is that minimum voltage required to be applied to the coil of the relay to cause its armature to be moved from a magnetically unattracted position to an attracted position and operation of its associated switch. The pull-in voltage is somewhat higher than the drop-out voltage.

It is well known that the voltage of a conventional auto battery is related to its charged condition. Use is made of this fact by using the battery voltage to automatically disconnect the battery when its charged condition deteriorates below a predetermined value beyond which there is greatly decreased likelihood that the battery would be sufficiently strong to start the engine. This predetermined value of battery voltage is the drop-out voltage of the relay, and when the relay drops out, the battery is disconnected from the wiring to the current consuming devices including also the starter energizing circuit; and in accordance with an important feature of the present invention when this condition exists, i.e. the relay drops out, an attempt to energize the starter circuit by conventional means provided for that purpose is futile, and the autoist learns of his futile efforts and also the drop-out state of the relay by the absence of any starter and engine noises. He is thereby alerted, by such absence of noise, that other means are required to start the engine, and such other means in accordance with additional important features of the present invention involves an additional element which is required to be manually operated in addition to and simultaneously with, for example, the conventional starter button in order to realize that battery energy which was conserved as a result of the relay drop-out. Of course, he is also alerted to the charged condition of the battery and contemplates finding faults in the auto wiring, fan belt, generator-regulator system, etc. and the nature of the kind of inadvertence, accident or mistake mentioned above if the same had not already been noticed upon his return to his auto.

It is therefore an object of the present invention to provide means and techniques whereby one or more of the desirable features above indicated may be realized.

Another object of the present invention is to provide such means for these purposes which are simple, inexpensive and easy to install in existing autos.

Another object of the present invention is to provide means and techniques whereby the relays made and used for these purposes need not have rigorous tolerances with respect to drop-out voltage whereby inexpensive relays may be used.

Another object of the present invention is to provide a system for obtaining the following results and advantages, namely: prevention of starting failures by a saving of 25 to 35% of a battery's ampere hour capacity for cranking duty; prevention of catastropic battery failures by eliminating absolute discharge with attendant battery sulfation, plate swelling and buckling and shedding of active material from the battery plates while in a very low charged condition; and further, to serve as a notice to the vehicle of such possible defects as burned out generators or voltage regulators, broken or loose fan belts, wiring shorts, etc.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGS. 1 to 4 are each circuit diagrams of corresponding four different forms of the present invention.

FIG. 5 is a graph illustrating the relationship between the charged condition of a battery and the drop-out voltage of the relay used in either FIGS. 1–4.

FIG. 6 is a graph illustrating characteristics of the Zener diode used in FIGS. 2–4.

In each of FIGS. 1–4, the conventional auto battery is illustrated at 10 with its positive terminal connected to ground, i.e. the auto chassis, and various current consuming devices of the auto together with their respective control switches are represented generally by the load 12 and are normally connected to the battery by wiring represented by the wires 14A and 14B. Using this representation, in a conventional auto the wires 14A and 14B are permanently connected, but in accordance with the present invention are connectable by a relay switch 16 of relay 18 having one terminal of its coil 20 grounded and its other terminal connected directly to the ungrounded terminal of battery 10 as in FIG. 1, or through a corresponding Zener diode 22, 24, 26 in FIGS. 2, 3 and 4, respectively.

In each case, when the battery is more than sufficiently

"strong" to start the engine, i.e. its voltage is high, the relay coil 20 is sufficiently energized to maintain the switch 16 closed thereby interconnecting wiring 14A and 14B for conventional operating practices. Should, however, the battery deteriorate in strength in its parked or garaged condition under any of the circumstances indicated above, its voltage decreases to a point comparable to the drop-out voltage of the relay, and when this latter condition exists, the relay drops out, i.e. the relay switch 16 opens thereby preventing further discharge of the battery into wiring 14B and load 12. However, this drop-out voltage and correspondingly the voltage of battery 10 is such that the battery, while in a weakened condition, is still strong enough to start the engine and have itself recharged when the engine drives its generator, the starter generator and its conventional regulator being excluded for purposes of simplicity of illustration in FIGS. 2 and 3, but being illustrated in FIG. 1.

As shown in FIG. 1, the starter 2, generator-regulator system 3, starter relay 4, ammeter 5, key switch 6, and starter push button switch 7 are illustrated and are connected in conventional manner as now described. The ungrounded terminal of battery 10 is connected to one terminal of a heavy lead 8 having its other terminal connected to one terminal of the switch of relay solenoid 4, the other terminal of such switch being connected to the ungrounded terminal of starter motor 2. Such lead 8 is connected also to one terminal of a lead 9 (within which the ammeter 5 is shown connected), the other terminal of lead 9 being connected to the ungrounded terminal of the generator-regulator system 3 and also by lead 11 to one terminal of key operated switch 6 having its other terminal connected to both the aforementioned lead 14A and to one terminal 7A of starter push button switch 7 having its other terminal 7B connected to the ungrounded terminal of the solenoid winding of starter relay 4. It will be appreciated that energization of the starter motor 2 requires closure of switches 6 and 7, as illustrated in FIG. 1; however, instead of the switch terminal 7A being connected to lead 14A, it is preferably connected to lead 14B, as shown in FIG. 2, in which case energization of the starter motor 2 requires closure of three switches, namely switches 6, 16 and 7A.

It will be appreciated also that the load 12 includes the control switches for the corresponding loads which may be selectively energized and that the auto radio may be one of such load elements or, for example, the radio and its on-off switch may be connected with the ungrounded terminal of the radio assembly being connected to lead 9 whereby the same may be "played" by operation only of the radio on-off switch.

The function of relay switch 16 is best understood with reference to the voltage-charge graph of the battery exemplified in FIG. 5. It is apparent therefrom that the battery output voltage varies with the degree of charge or, conversely, discharge. The relay switch opens at a point of discharge on a nominal 12 volt auto battery of 12.6 volts corresponding to approximately 25% or 30% charge (70% discharge corresponds to 30% discharge in FIG. 5), and in FIG. 1 such relay switch closes at approximately 13.8 volts corresponding to 50% charge or whenever the generator charged the battery and such relay switch remains closed at all times unless the battery voltage falls below 12.6 volts. When the battery is discharged to this point of 25% to 30% charge, the voltage decreases to a point where relay switch 16 opens assuring disconnection of load 12 and saving the last 25% to 30% of the battery's charge for starting duty. Thus, the operation of relay switch 16 performs the duty of a "battery guard" and operates to prevent accidental total discharge of a battery when lights, radio, ignition or other loads were left on.

Once the switch 16 has opened, an attempt by the autoist to start his auto is futile (when switch terminal 7A is connected to lead 14B in FIG. 1A) and readily noticeable to him because of the absence of starter and engine noise. He is thus alerted, by such absence of noise, to use other means, and such other means in some forms of the present invention is a button 28 mechanically connected to the movable element of switch 16 to effect reclosure of switch 16 upon pushing of button 28, the switch 16 being urged to open position by, for example, spring means, upon release of button 28. Thus, the button 28 may be considered as a part of a so-called momentary push button switch since (assuming the coil 20 insufficiently energized to close switch 16) continuous manual effort is required on button 28 to maintain switch 16 closed. The button 28 is depressed to restore the ignition and starter relay circuit until the start cycle is complete and the generator raises the battery voltage to a level which self-maintains the relay switch 16 closed without further manual effort being exerted on button 28. Usually the battery voltage rises instantaneously to this point due to the generator charging current voltage drop across the internal resistance of the battery which voltage drop is in additive relation to the normal battery voltage.

Upon simultaneously closing of switch 16 and the conventional starter switch of the auto, the engine starts with that battery energy conserved as a result of prior automatic opening of switch 16, such energy being otherwise available if the wiring 14A and 14B had been permanently interconnected as in conventional autos.

After starting the auto using push button 28, the voltage of battery 10 rises as a result of the generator charging the battery and when the battery voltage reaches the pull-in voltage of the relay 18, the coil 20 is sufficiently energized to move its armature 21 to its magnetically attracted position and maintain switch 16 in its closed position without further application of manual force to push button 28.

The drop-out and pull-in voltages are different, the latter being the higher voltage and the difference in such voltages being termed herein the differential voltage. The relay described in FIGS. 1 and 1A required to work with a differential of 1.2 volts has only approximately 8.7% differential in its pull-in and drop-out voltages and thus is more expensive then relays with greater differential voltages.

The provision of a Zener diode in FIGS. 2–4 makes the construction of the relay simpler and less expensive when a comparison is made on the basis of differential voltage. The Zener diode shown in these figures has the well-known characteristic illustrated in the graph in FIG. 6 wherein abscissae represent voltage applied to the terminals of the diode, and the ordinates represent the resulting current flow through the diode. When used with a battery having a nominal voltage rating of 12 volts, the Zener diode is correspondingly a 12 volt diode which means, as illustrated, that at voltages below 12 volts the current passed by the diode is measured in terms of microamperes insufficient to actuate the relay, but when the voltage exceeds 12 volts, the resistance of the diode drops sharply to substantially a zero resistance, as indicated by the sharply rising portion of the graph.

The beneficial use of a Zener diode will appear from the following discussion in which a comparison is made between FIGS. 1 and 2 and in relationship to the characteristics of a nominal 12 volt storage battery illustrated in FIG. 5 wherein the ordinates represent the voltage of the battery and the abscissae represent the degree of discharge of the battery, it being noted that such voltage is represented as being 14.2 volts for the fully charged battery, 13.8 volts for a 50% discharged battery, 12.6 volts for a 70% discharged battery, and 12 volts for a 75% discharged battery, and that the "knee" of the graph is at approximately the 70% point with the voltage dropping more rapidly after the battery is discharged 70%. In a nominal 12 volt system the drop-out voltage in relationship to the battery is preferably somewhere within the 70% to 75% range, and in the present discussion it will be considered to be at the 75% point corresponding to a voltage of 12.0 volts with the pull-in voltage of the relay of FIG. 1 being 12.2 volts. In the system shown in FIG. 1, there is a gradual change in current between the range 12.0 to 12.2 volts, but an abrupt change in current through the relay in FIG. 2 because of the characteristics of the Zener diode which means that a less expensive relay may be used in FIG. 2. Another advantage is that there is considerably less current drain from the battery through the relay in FIG. 2 at battery voltages less than 12.0 volts.

Operation of the Zener diode circuit of FIG. 2 may be summarized as follows. Assuming the Zener diode unit is a 12 volt unit, the relay coil is 22.5 ohms, 80 milliamperes is the closing current and 27 milliamperes is the current at which point the relay opens. This relay has a differential of 300% in pull-in and drop-out currents instead of 8.7% (80/27=300%). It is noted that the voltage drop across the Zener diode is subtracted from the battery voltage as it appears across the relay coil.

At 50% charge or 13.8 volts on the battery terminals, the relay will be energized by 13.8 minus 12.0 or 1.8 volts. At 25 to 35% charge or 12.6 volts on the battery terminals, the relay will be energized by 12.6 minus 12.0 or 0.6 volt. A further study shows 1.8 volts applied to 22.5 ohms coil produces (1=E/R) or current (amps) =1.8 volts/22.5 ohms 1=0.080 amps or 80 milliamps, the close current of the relay. Furthermore, when 0.6 volt are applied to the relay, the current is (1=E/R) or (.6 volt/22.5 ohms)=0.0266 amps or 27-milliamps which is the drop-out current of the relay. The battery drain at 14 volts is 14.0 minus 12.00 or 2 volts/22.5 ohms=88 milliamps. At 12 volts the drain is zero. The average drain is 44 milliamps. For an 80 ampere hour battery this is 1820 hours or 76 days. At the end of 76 days, the drain becomes essentially zero as the 12.0 volt point approaches.

The arrangement in FIG. 3 is like that in FIG. 2, but in this case, after the relay switch 16 has automatically opened in response to battery voltage at approximately 12 volts, the switch 16 may be closed by manual operation of the momentary type push button switch 30 which when closed applies the battery voltage to the relay coil and causes the switch to close. The provision of this switch 30 has the advantage that it is small and may be located at a convenient location as, for example, on the dashboard of the auto where space requirements are a problem. In other words, the relay itself with its associated manual actuator 28 in such case need not be mounted on the dashboard, convenience being accomplished by mounting the switch 30 on the dashboard. A resistor for limiting current flow through relay coil is optional.

In FIG. 4, the starter control circuit instead of being connected to the lead 14B as in FIGS. 1A, 2 and 3 is now connected to the lead 14A, i.e. directly to the ungrounded terminal of battery 10, the starter motor being shown at 32 and its control relay at 34 with one terminal of the relay switch 35 being connected to lead 14A and the other terminal of relay switch 35 being connected to the ungrounded terminal of starter motor 32.

The coil 37 of relay 34 has one of its terminals grounded and the other one of its terminals connected through resistance 38 to the junction point of Zener diode 26 and relay coil 20, i.e. to the ungrounded terminal of coil 20. A manually operable momentary push button type switch 40 has one of its terminals connected to lead or wiring 14B and the other one of its terminals connected to the junction point of resistance 38 and coil 37, i.e. to the ungrounded terminal of coil 37.

In FIG. 4, with a fully charged battery the switch 18 is closed as in the previous figures as a result of sufficient current flowing through coil 20, and the engine may be started by manually depressing the starter button of switch 40. Even though there is a conductive connection involving resistance 38 between the ungrounded terminals of coils 20 and 38, the resistance 38 is of sufficiently high value to prevent the starter relay switch 35 from closing without closing of switch 40. When the battery discharges to render Zener diode 26 substantially nonconductive, insufficient current flows through coil 20 and switch 16 opens for conserving the remaining charge of the battery. This conserved charge may be used to energize the starter motor 32 only upon simultaneous manual closing of switches 16 and 40. The manual closing of switch 16 results in battery voltage being applied to one terminal of switch 40, and the simultaneous manual closing of switch 40 results in such voltage being applied to the starter solenoid coil 37 and also to the solenoid coil 20 through resistance 38, the resistance 38 being sufficiently small in value to allow sufficient current to flow through the coil 20 to cause it to maintain switch 16 in its closed position. The resistance of coil 20 is low in comparison to the resistance of the starter solenoid coil 37 and may be approximately one-eighth the value of resistance 38 for these purposes.

In FIG. 4, provision is made for the temporary reduction in battery voltage due to high starter motor loads, the current to the relay coil 20 being supplied through current limiting resistance 38. The connections are such that the relay coil 20 is supplied with voltage without the voltage drop of the Zener diode. When resistance 38 is 50 ohms and the coil resistance is 22.5 ohms, the battery voltage could drop to 6 volts and yet supply 82.5 milliamperes to the relay coil 20.

It will be observed that the manual operation of two different elements is required to energize the starter motor once the battery has been discharged beyond a certain voltage point. This feature in and of itself provides an indication of the condition in the battery and/or the existence of present or past abnormalities.

While the graph of FIG. 5 is for a nominal 12 volt storage battery, it will be seen that the same is representative also of other battery systems such as 4 volt, 6 volt, 24 and 32 volt systems, since the conventional battery is made up of individual nominally 12 volt cells and thus, the present invention is applicable also to such other battery systems having a nominal voltage different than 12 volts.

In some cases, the manual actuator 28 may be omitted, and a manually operable switch such as 30 in FIG. 3 may be connected in parallel with the diode 26 for effecting closure of switch 16. Also, as indicated in FIG. 1A, a manually operated momentary type push button switch 31 may be located on the dashboard of the auto and is connected in parallel with switch 16 as a substitute for the push button 28 in FIGS. 1–4.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a system of the character described, a storage battery, a load circuit, a starter motor, a first relay having a first winding and a first switch, a second relay having a second winding and a second switch, said first switch serving to connect said battery to said load, said second switch serving to connect said battery to said starter motor, said first winding being connected across the terminals of said battery and being sufficiently energized in a charged condition of said battery to close said first switch and being sufficiently deenergized in a partially discharged condition of said battery to allow said first switch to open, a Zener diode, a resistance, said second winding being connected across the terminals of said battery through said Zener diode and said resistance, said second switch serving to connect said battery to said starter motor, a manually operated switch, and an energizing circuit for said second winding comprising a series connection of said first switch with said manually operated switch.

2. A system as set forth in claim 1, including manually operated means for closing said first switch.

3. A system as set forth in claim 2 wherein said Zener diode is connected between said first winding and said battery with said resistance being connected directly between terminals of said first and second windings.

References Cited

UNITED STATES PATENTS

| 1,207,016 | 12/1916 | Fryer. | |
|---|---|---|---|
| 2,051,514 | 8/1936 | Black | 320—40 |
| 2,501,514 | 8/1936 | Block | 320—40 |
| 2,485,727 | 10/1949 | Gallina | 307—10 |
| 3,194,970 | 7/1965 | Claps | 307—10 |

OTHER REFERENCES

Silicon Zener Diode and Rectifier Handbook, Motorola Corporation, 3rd edition, 1961.

ORIS L. RADER, *Primary Examiner.*

W. E. DUNCANSON, *Assistant Examiner.*